March 19, 1957 — N. CORDIS — 2,785,792
PADDLE-TYPE RECIPROCATING TROUGH FEEDERS
Filed Oct. 2, 1953 — 3 Sheets-Sheet 1
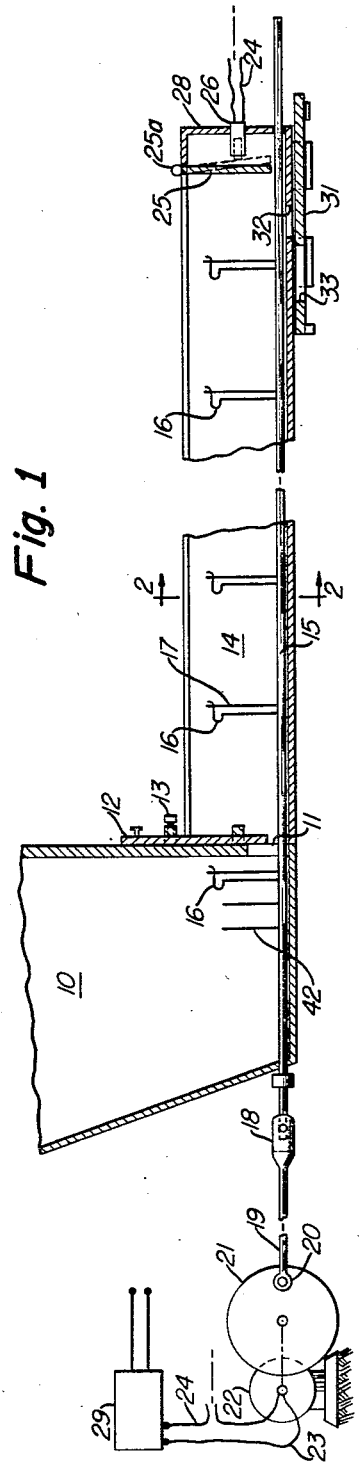
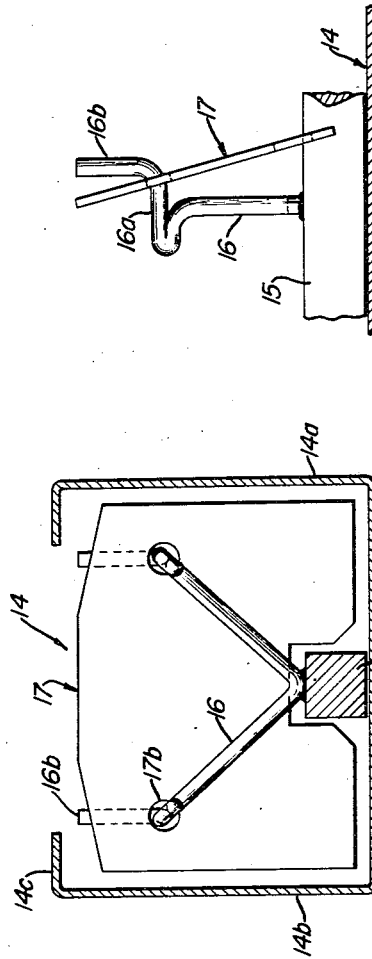
INVENTOR
Nat Cordis
BY Everett A. Johnson
ATTORNEY March 19, 1957 N. CORDIS 2,785,792
PADDLE-TYPE RECIPROCATING TROUGH FEEDERS
Filed Oct. 2, 1953 3 Sheets-Sheet 2

*INVENTOR*
*Nat Cordis*
BY *Everett A. Johnson*
ATTORNEY

March 19, 1957  N. CORDIS  2,785,792
PADDLE-TYPE RECIPROCATING TROUGH FEEDERS
Filed Oct. 2, 1953  3 Sheets-Sheet 3

INVENTOR
Nat Cordis
BY Everett A. Johnson
ATTORNEY

United States Patent Office 2,785,792
Patented Mar. 19, 1957

2,785,792

PADDLE-TYPE RECIPROCATING TROUGH FEEDERS

Nat Cordis, Silver Lake, Wis., assignor of one-half to Gerald L. Kitson, Rockford, Mich.

Application October 2, 1953, Serial No. 383,889

8 Claims. (Cl. 198—224)

This invention relates to conveyors for pulverant materials and more particularly to a feeding device for distributing such materials along a trough accessible to stock and poultry. Still more specifically the invention is an improvement in a method and means for automatically distributing feed in trough-type animal feeders.

The problem of controlled feeding of live stock such as poultry, on a large scale necessarily involves much manual attention. It is therefore a primary object of my invention to provide a feeder of large capacity in which the supply can be maintained with a minimum of manual attention. Another object is to provide a method and an automatic means for uniformly distributing an adequate supply of fresh feed within a flock feeder. Still another object is to provide an apparatus which maintains a fresh supply of feed in a trough and avoids clogging with stale feed. A further important object of my invention is to provide a means for automatically controlling the starting of the feed distributing apparatus at selected intervals and for stopping the distributing system when feed has been advanced uniformly throughout the trough system. These and other objects of the invention will become apparent to those skilled in the art as the description of my invention proceeds.

Briefly I attain the objects of my invention by providing a trough having a portion thereof in communication with a hopper. A plurality of spaced pusher paddles are pivotally carried by an operating bar which is oscillated longitudinally within the trough adjacent the bottom thereof. The operating bar or rod is provided with hangers for pivotally supporting the paddles above their centers of gravity so that the paddles may assume a generally vertical position with their backs to the upstanding hangers or support members during the pushing or feeding stroke. On the return stroke the paddles swing away from the hangers and ride over the advanced feed in the trough. Feed is discharged from the hopper into the trough at a controllable rate and withdrawal from the hopper is regulated by the motion of the reciprocating bar and its paddles to be sufficient to introduce a quantity in each pass equivalent to that normally confined between the paddles in the trough.

Further details of my invention will be described by reference to the accompanying drawings wherein:

Figure 1 is a schematic elevation, partly in section and showing the general assembly of parts;

Figure 2 is a section taken along the line 2—2 in Figure 1 showing details of the distributor paddle and paddle support in one modification;

Figure 3 is a side view of the paddle along line 3—3 in Figure 2 with the trough walls removed;

Figure 8:
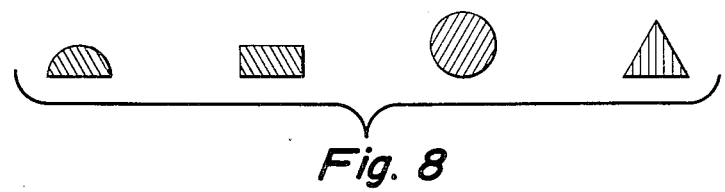
Figure 4:
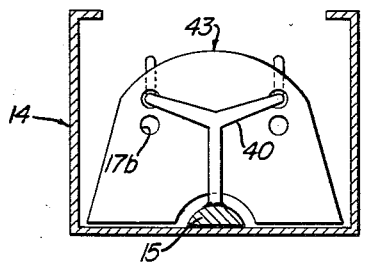
Figure 5:
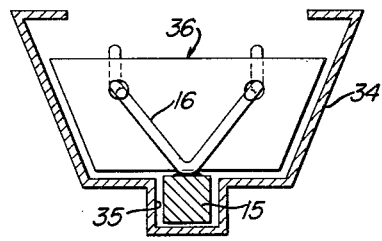
Figure 6:
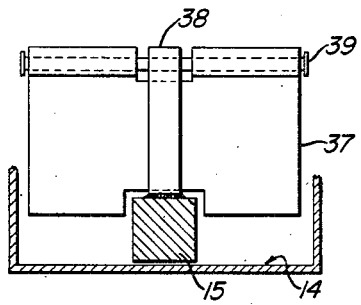
Figure 7:
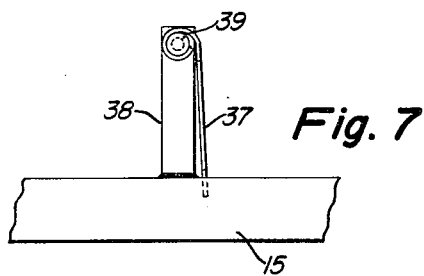

Figures 4, 5, and 6 illustrate other embodiments of the trough, paddle, paddle support, and operating rod;

Figure 7 is a side view of the modification in Figure 6;

Figure 8 includes a number of shapes of cross sections which the operating rod or arm may take.

Figure 10:
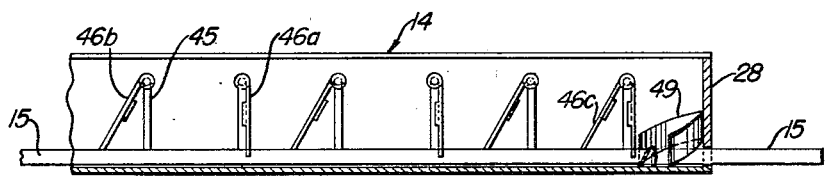
Figure 9:
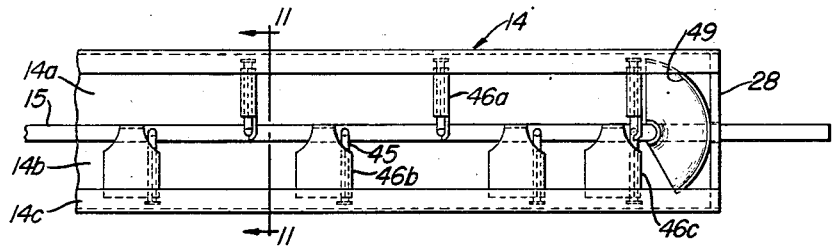
Figure 11:
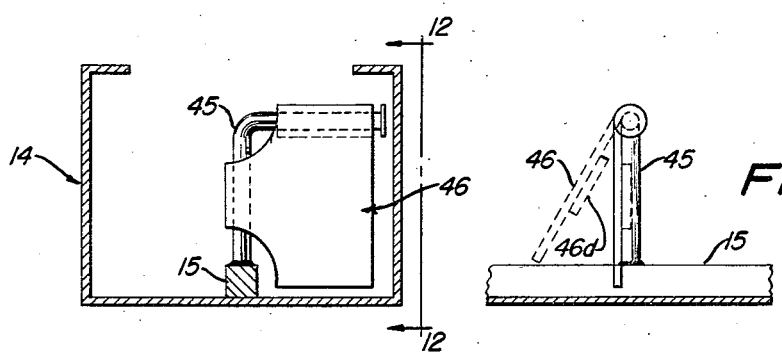
Figure 12:
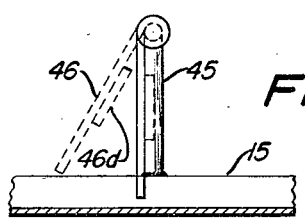
Figure 13:
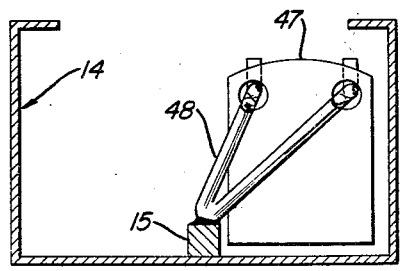
Figure 14:
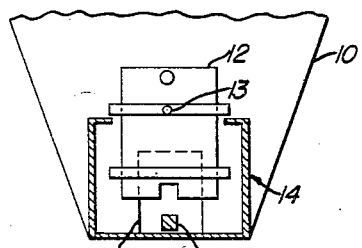

Figure 9 is a plan view of a straight line, feed return system;

Figure 10 is a section taken along the line 10—10 in Figure 9;

Figure 11 is a section taken along the line 11—11 in Figure 9;

Figure 12 is a side view of Figure 11;

Figure 13 is a section of another embodiment having a paddle mount similar to that illustrated in Figure 2; and Figure 14 is a section along 14—14 in Figure 1.

Referring to Figure 1 of the drawings, a pulverant material such as poultry feed is supplied from hopper 10 through a discharge port 11. A sliding gate 12 is held by a suitable means such as locking bolt 13, at the level to permit the desired rate of flow from the hopper 10 through the port 11 into the trough 14. The conveyor assembly, including the operating arm 15, the upstanding paddle support members 16 and the swingable paddles 17, is caused to move in a push-pull fashion within the trough 14 by a reciprocating power unit. One end of the operating bar 15 is connected to the power unit by means of a yoke 18 and a pitman link 19 with a crank pin 20 on the revolving drive plate 21 arranged to be rotated by a prime mover such as electric motor 22 which is supplied with electrical current through leads 23 and 24.

Details of the paddle supports or hangers 16 and the paddles 17 are shown in Figures 2 and 3. The operating bar 15 is shown as resting on the floor of a trough 14 having sidewalls 14a and top flanges 14b. However, the rod 15 may be disposed within a rod-conforming channel 35 (Figure 5) or supported on a riser, either formed integral with the trough or supported on the flat bottom of the trough. The riser itself may have a rod-guiding channel.

Welded, or otherwise fixed to the upper face of the operating bar 15 is a generally V-shaped support formed of heavy wire. It has the form shown in Figures 2 and 3 to provide a paddle-supporting ledge 16a and a paddle-retaining hook or stop 16b. Openings 17b, above the center of gravity of the paddle 17 receive the hooks 16b so that the paddle rests on the two lateral ledges 16a. A central cut-out 17a permits the paddle 17 to straddle the operating bar 15 so that the bottom edge of the paddle 17 is near the trough bed on the feed-advancing stroke.

In a typical installation, the trough 14 may be about 3.25 inches wide, 2.75 inches deep with two flanges 0.375 inch wide. The paddle 17 may be about 2.75 inches wide, and from about 2.25 to 1.75 inches high. The height of the paddle hanger and the location of the openings 17b will determine the depth of feed permitted to accumulate below the paddles on the bottom of the trough. If desired, two sets of holes 17b can be provided for hanging the paddles, either deep or shallow, within the trough on the hangers. One such arrangement is illustrated in Figure 4 but the two sets of 17b can of course be applied to the paddles shown in Figures 2 and 5. Also the paddles can be supplied with a scored bottom portion to permit the easy shortening of the paddle to fit the particular needs of the operator.

When the port 11 is open as shown and the operating rod 15 of the conveyor assembly is reciprocated by the oscillating power unit, the paddles 17 first assume the vertical position of Figure 1. In this position the paddles push feed away from the hopper 10 along the trough 14 to advance the feed an increment of the total length of the trough, for example an increment of about 5 to 10 inches. This corresponds to the spacing of the hangers 16 and paddles 17 along the operating rod 15.

The direction of motion of the operating rod 15 is cyclically reversed by the oscillating or reciprocating power unit including in the illustrated embodiment: the motor 22, the drive plate 21, the crank pin 20, and the link 19, terminating with the yoke 18. Upon the return or "pull" stroke of the arm 15, the paddles 17 lift up as in Figure 3 and ride over the feed advanced within the trough 14 by the previous "push" or delivery stroke of the operating arm 15.

This cycle is repeated at a rate of from 30 to 50 strokes a minute with feed being supplied to the inlet end of the trough 14 by any suitable means from a hopper. As illustrated, this is done by gravity flow through port 11 below adjustable gate. When the feed already discharged from the port 11 is moved, more feed comes in to take its place but it does not continue to discharge if the feed piles up in front of port 11, i. e., when the operating rod and paddles are at rest. Until the trough is filled to desired extent the operating arm 15 continues to oscillate within the trough 14 (and along the bottom of the hopper 10), bringing feed from the hopper into the trough 14 and advancing feed from the inlet end to the terminal end. Finally the feed advanced by the paddles reaches and piles up against the hinged switch-actuating end plate 25.

The weight of the hinged plate 25 at the end of trough 14 is sufficient to hang vertically but when feed is pushed against it by the paddles 17 of the conveyor assembly, the plate swings toward the end of the trough 14 and depresses switch 26. This switch may suitably be of the spring-loaded micro type and is in the lead 24 to motor 22 or operates an independent on-off switch (not shown) which controls the actual power to the motor. Opening of the switch, in any event, cuts off the power thereby automatically stopping the motor 22 and hence the push-pull of the operating arm 15. A timer 29 controls the power source to the motor 22 to run the motor at selected times for selected periods. However, the switch 26 over-rides the timer as described above during the feeding period and stops the conveyor assembly when the trough 14 becomes full. If it is desired to by-pass the switch 26 for any reason, it is merely necessary to swing the plate 25 upwardly about its hinge 25a and out of the path of the feed. This may be done for example when it is desired to remove all feed from the trough 14, by opening the sliding trap door 31 to bring the ports 32 in the trough into register with the port 33 in the door 31 and by closing the port 11.

It may be desired to have several trough units in series, fed from a single hopper. In that event the port 32 is exposed and the feed advanced in the trough is discharged through the port 32 onto the inlet end of another trough unit similar to trough 14 described above. The switch plate 25 on the first unit trough is lifted to by-pass the switch 26 but a corresponding plate and switch on the final trough section in the series would control the reciprocating power unit.

The operating bar is placed within the trough 14 and out of the way of the feeding poultry. Since it is in the trough it rides on or is submerged in the advancing feed making for silent operation and avoiding any interference with the poultry. The paddles swing silently and are either pushing feed or are slipping quietly over the advanced feed.

Referring to the operating bar 15, it may have various forms, for example such as half-round, rectangular, round, and triangular cross section as illustrated in Figure 8. On the portion of the arm 15 running within the hopper 10 are a plurality of agitator fingers 42 which prevent bridging of the feed. If desired a hanger and paddle unit may be arranged within the hopper as illustrated in Figure 1 to urge the feed therefrom as the supply gets low. The free end of the arm 15 extends through a slot in the end wall 28 of the trough 14, the slot serving as an end guide for the reciprocating rod 15. Alternatively a sleeve (not shown) may be fixed to the bed or the trough near the terminal end to receive the reciprocating end of the arm. Other hold-downs can of course be devised by those skilled in the art.

In Figure 5, I have illustrated another type of trough 34 wherein the operating arm 15 is carried within a longitudinal channel 35. In this arrangement the paddle 36 has a straight bottom edge and outwardly flaring side edges. It is contemplated, however, that any one of the shapes of operating bars 15 may be used with paddles and troughs in various combinations. When the paddle edges and side walls of the trough are not substantially parallel, such as in Figure 4, a larger volume of feed can be accumulated or distributed along the sides of the trough than is the case of the modification in Figures 1, 2 and 3. Also the bottom edge of the paddle can be spaced a substantial distance from the trough bottom as shown in Figure 6.

With reference to Figures 6 and 7, I have there illustrated a hinge-type hanger for supporting the paddles including a single upright support 38 with a cross arm pivot 39 adapted to be encircled by the rolled upper edge of the paddle 37, but other hinge supports may be used. In Figure 4 a Y-shaped hanger 40 supports the paddle 43 on the operating arm 15 (the half-round of Figure 8) within a trough 14 as shown in Fig. 2.

Referring to Figures 9 and 10, the trough 14, is provided with the rod 15 which is moved longitudinally within the trough as described above in connection with Figure 1. However two arrays of paddles on the rod 15 cause the flow of feed in two directions within the single trough. The paddles 46 are supported by inverted L-shaped brackets 45 as shown in Figure 11, one group of paddles being on one side of the rod 15 and another group on the other side. The spacing between paddles 46a or 46b in the two arrays is uniform and less than the length of the stroke of the rod 15, one additional paddle 46c being provided near the discharge edge of the ramp 47. In this way, one pass of the rod 15 longitudinally within channel 14a of the trough 14 will cause paddles 46a to push feed along the trough toward the closed end 28 of the trough 14, while the paddles 46b pass over the previously advanced feed in channel 14b. On the next stroke, the paddles 46a pass over the advanced feed and the paddles 40b push feed from the closed end toward the hopper end of the trough. This cycle operation results in feed being conveyed along the inlet channel 14a of the trough 14, over the ramp 49 into the return channel 14b, and along the channel 14b back to the hopper means.

Figures 11 and 12 show details of the trough 14, the rod 15, the paddle 46, and the bracket 45. The paddle 46 has a longitudinal edge portion which abuts the upright support 45 in the feed-advancing stroke. In Figure 13 the paddle 47 is generally similar to paddle 17 of Figure 2 and the wire bracket 50 is patterned after that of Figures 2 and 5 but is modified to suspend the paddle 49 in only one channel.

The trough 14 may be divided into the channels 14a and 14b by a separate longitudinal baffle (not shown) over the rod 15 but in most instances the rod itself is sufficient to effect the partitioning of the trough. It is also contemplated that the oppositely hung paddles may be arranged in pairs on opposite sides of the rod. For example, the support may be T-shaped as shown in Figure 6, but with two paddles such as shown in Figure 11 hung on opposite sides of the arms of the support and swingable in the manner of paddles 45a and 45b.

In Figure 14, I have shown the construction of the flow control from the hopper 10. The adjustable door 12 is provided with a notch 12a to accommodate the rod 15 and the discharge port 11 can be controlled thereby. When the trough 14 is filled with feed to the point that no further feed is discharged by gravity from the port 11, the rod can be stopped. This can be done automatically by providing a switch 26 in the side wall or floor of the channel 14b near the hopper end of the trough 14. A suitable hinged or spring-loaded plate can be depressed when the proper depth of feed has accumulated.

The operating arm 15 is rigid and may suitably be made of iron, other metal, wood, or other material. It may be solid in cross section or tubular. The troughs 14 are of sheet metal, such as galvanized iron, aluminum, or copper, etc. The paddle supports are of heavy or stiff wire, rod stock, or the like. The paddles are of light plate stock, being relatively thin and light so as to ride over the advanced increment of feed as described. Other materials will be apparent to those skilled in the art after having the benefit of the description of my invention. Likewise other modifications of apparatus components and equivalent elements thereof can be substituted for the illustrated examples without departing from the spirit of my invention.

This application is a continuation in part of my copending application Serial No. 370,736 filed July 28, 1953 for Reciprocating Paddle-type Trough Feeder.

What I claim is:

1. A stock feeder comprising a pair of contiguous parallel channels providing a trough means, a first array of suspended paddles in the first of said channels, a second array of suspended paddles in the second of said channels, the paddles in said arrays being swingable oppositely, and means within said trough means for reciprocating said arrays in unison, whereby upon movement in one direction the paddles in the first array advance feed within the first channel while the paddles in the second array swing rearwardly to pass over previously advanced feed in the second channel and whereby upon movement in the other direction causes the second array to advance feed in the second channel while the paddles in the first array swing rearwardly to pass over previously advanced feed in the first channel.

2. The system of claim 1 wherein said paddles are suspended with their bottom edges close to but spaced from the bed of said trough.

3. A stock feeder comprising a feed-supply hopper having a discharge outlet, conduit means communicating with said outlet, said conduit means comprising an open-topped horizontal trough affording access by stock to feed contained therein, a rigid means within said trough dividing said trough into two channels, a first array of feed-advancing paddles extending into one of said channels, a second array of feed-advancing paddles extending into the other of said channels, the paddles of said first and second arrays being swingable in opposite directions so that reciprocation of said rigid means and said arrays in said trough causes the feed to travel in series through said first and second channels.

4. The apparatus of claim 3 wherein the said paddles are suspended on V-shaped wire supports fixed to said operating bar and said paddles each comprises generally rectangular plates substantially less than the width of the trough and with a major portion above said operating bar at all times, said paddles having spaced pivot-receiving openings near the top edge for pivotal suspension on said V-shaped wire supports.

5. A conveyor system of the reciprocating paddle type including trough means, swinging paddles, reciprocating means for driving the paddles, and hanger means supported by the reciprocating means to suspend the paddles and wherein the said paddles extend laterally across about one-half of the width of the trough, one group of paddles being adapted to advance feed in one direction in said trough and the other group being adapted to advance feed in the opposite direction within the same trough.

6. The apparatus of claim 1 wherein the length of the stroke of the operating bar is greater than the distance between adjacent pusher paddles on said bar.

7. The apparatus of claim 1 wherein the said operating bar has a stroke of about 7 inches and the said paddles are spaced a distance of about 6 inches.

8. A poultry feed distribution system comprising in combination feed trough means accessible to poultry, means for advancing feed along the bottom of said trough means comprising a plurality of pusher paddles suspended transverse to the longitudinal axis of the trough means and in spaced relation to each other along a length of a trough in said trough means, an operating bar supported axially of said trough, paddle support hangers carried by said bar supporting said paddles with their bottom edges spaced from the bottom of the said trough, the said paddles extending laterally across about one-half of the width of the trough, a first group of paddles being adapted to advance feed in one direction in said trough and a second group arranged oppositely with respect to the first group being adapted to advance feed in the opposite direction within the same trough, and means for reciprocating said operating bar in an advancing stroke and in a return stroke, whereby said paddles assume a substantially vertical position during the advancing stroke of said first group and the lower edges swing upwardly over the advanced feed on the return stroke.

References Cited in the file of this patent

UNITED STATES PATENTS

| | | |
|---|---|---|
| 435,792 | Bon | Sept. 2, 1890 |
| 1,156,544 | Nevill | Oct. 12, 1915 |
| 1,299,661 | Beam | Apr. 8, 1919 |
| 2,043,595 | Raymond | June 9, 1936 |
| 2,494,626 | Nickerson | Jan. 17, 1950 |
| 2,593,340 | Petraske | Apr. 15, 1952 |